United States Patent [19]

Arzoumanian

[11] Patent Number: 5,382,941
[45] Date of Patent: Jan. 17, 1995

[54] VEHICLE ALARM SET SIGNAL LEVEL CONTROL

[75] Inventor: S. Allen Arzoumanian, Woodland Hills, Calif.

[73] Assignee: Accele Electronics, Cerritos, Calif.

[21] Appl. No.: 975,374

[22] Filed: Nov. 13, 1992

[51] Int. Cl.$^6$ ............................................. B60R 25/00
[52] U.S. Cl. ................................. 340/426; 340/425.5;
340/502; 307/10.2
[58] Field of Search ..................... 340/426, 502, 425.5;
307/10.2

[56] References Cited

U.S. PATENT DOCUMENTS

| | | | |
|---|---|---|---|
| 4,800,361 | 1/1989 | Greif | 340/426 |
| 4,866,417 | 9/1989 | Defino et al. | 340/429 |
| 4,885,572 | 12/1989 | Iwata et al. | 340/426 |
| 4,996,515 | 2/1991 | Schaffer et al. | 340/502 |

*Primary Examiner*—John K. Peng
*Assistant Examiner*—Edward Lefkowitz
*Attorney, Agent, or Firm*—David O'Reilly

[57] ABSTRACT

A vehicle alarm set signal level control that controls the volume of a car alarm and also the output level of the alarm setting or arming signal. The alarm volume is controlled by a frequency responsive circuit employing a silicon control rectifier in combination with a zener diode and a resistance that can be left in or removed from the circuit. Arming signal level control is comprised of a bypass circuit employing a transistor and a photo detector in combination with a potentiometer. The level of the output signal when setting the alarm is varied according to the amount of light available. In an optional embodiment for a car alarm using a low level signal both an arming signal setting signal level control and a visible output are used. The circuit employs a pulse rate controller providing an output through a protection circuit and a volume control to a piezoelectric tone generator. The output level of the pulse rate controller is controlled by a resistance that can be left in or removed from the circuit or alternatively through a potentiometer. The arming signal level control is provided by a photo detector in series with a plurality of resistances limiting the current to the piezoelectric tone generator. A visible signal is provided by a light emitting diode positioned at some easily visible location in a vehicle receiving an output from a LED output device.

20 Claims, 2 Drawing Sheets

VEHICLE ALARM SET SIGNAL LEVEL CONTROL

FIELD OF THE INVENTION

This invention relates to vehicle alarm setting circuits and devices and more particularly relates to a vehicle alarm set signal level control.

BACKGROUND OF THE INVENTION

Vehicle alarm systems have become increasingly popular in recent years, particularly with the rising costs of automobiles. Their installation has become standard in more expensive vehicles and is an option on lower price models. The purpose of these systems are to deter theft of vehicles by setting off an alarm when attempts are made to gain unlawful entry into the vehicle. Some set off an alarm by any motion of the vehicle while others are activated merely by proximity sensors that sense a person approaching closely to a protected vehicle.

In some of these alarm systems the alarm is set by the driver when he leaves the vehicle. However, in other systems the alarm is set by a remote control device carried by the driver or owner on his key chain. In either case, when the alarm is set a chirping sound is produced to advise the driver or owner that the alarm has been activated. This chirping sound when setting the alarm can be annoying particularly at nighttime in residential areas. The alarm itself when set off provides a piercing, loud, high frequency sound that usually pulsates. The volume is loud enough to be heard for a considerable distance from the vehicle to draw attention to the fact that someone is tampering with a vehicle.

Because these alarm systems can be an annoyance at quiet times such as nighttime and particularly in residential neighborhoods, devices have been invented to turn off the chirping sound when the alarm is activated. One such device disclosed in U.S. Pat. No. 4,996,515 of Schaffer et al, dated Feb. 26, 1991 automatically suppresses the audible arm and disarm signals associated with these auto alarms. In this system a photo resistor cell is connected to a control circuit to indicate whether the light level is below a threshold level. This distinguishes daytime from nighttime. During the evening or nighttime hours the control circuit suppresses the system signal for a short interval to eliminate the audible chirping arm and disarm signal. Thus in this system the audible alarm is completely eliminated and no feedback is provided to the driver or owner whether the alarm has been set.

It is one object of the present invention to provide a system for controlling the level of the arm/disarm audio signal for an automobile alarm circuit.

Another object of the present invention is to provide an alarm set signal control system that controls not only the level but the period of time that the alarm set signal is to be set for.

Still another object of the present invention is to provide an alarm set signal control system that utilizes a silicon control rectifier to bypass the alarm setting signal to control the volume.

BRIEF DESCRIPTION OF THE INVENTION

The purpose of the present invention is to provide a system for controlling the alarm set signal level to lower the volume during evening and night hours.

The system of the present invention achieves the control of the alarm set signal by a circuit that adjust the alarm set chirp volume automatically depending upon the outside line conditions from normal high to very low almost unnoticeable volume in the later night hours. This is accomplished by varying the current flow to the siren with a transistor circuit.

The system of the invention uses short pulses during the alarm set chirp when arming or disarming the alarm and long pulses when there is an alarm output to provide maximum current to the audio alarm or siren. During the long pulses, when there is an alarm output for tampering of a vehicle, the siren provides maximum volume. However, during the period when the alarm is being armed or disarmed and the short pulses are being delivered, a transistor circuit controls the flow of current to the siren to provide low or high volume depending upon the light conditions. A light sensitive device controls a transistor which in turn controls current flow and the volume of the alarm circuit or siren. The more light that is sensed, the more current that is applied to the siren. As a result during daylight hours or when there is maximum light, the siren chirps loudest during arming and disarming. The less light the light sensitive device senses, the current to the siren is reduced and the alarm set or arm/disarm volume is softer. The maximum and minimum can be set by using a loop bypass or a potentiometer to set the maximum and minimum chirp volumes.

An additional device included is a warning tone or warning beeper system that provides a deterrent to vehicle theft. These devices are known and are used simply as a warning to stay away from a vehicle. They are different from an alarm because they do not emit a piercing signal but only a low warning tone when a person approaches or tampers with a vehicle. This warning tone as with the arm/disarm chirp can be annoying during the evening hours. The circuit of the present invention provides a light sensing device to light conditions to reduce or eliminate the warning tone during the nighttime.

An additional feature of the device is the inclusion of a light emitting diode (LED) that provides an alternate output when the tone generator's volume has been reduced or eliminated. Thus during the evening hours when the warning tone would be annoying, the light emitting diode takes over and is clearly visible. The light emitting diode can be mounted anywhere on the dash or somewhere where it will likely be seen during nighttime hours.

The circuit includes a pulse rate controller which controls the rate of the beep or warning tone providing an output to a piezoelectric tone generator. Volume of the tone is controlled by either a potentiometer or bypass loops which extend outside the housing of the warning tone generator. Two resistors in series with bypass loops allow four volume control settings. Usually when these volumes are sent they are not very often changed. By cutting one or both of the bypass loops the volume can be set. Maximum volume is with both loop bypasses uncut. With both loop bypasses uncut, maximum volume is achieved. Cutting one of the loop bypasses on the highest value resistor reduces the volume a first amount. Cutting only the other loop on the lowest value resistor reduces the volume a second amount. Cutting both loops causes current to flow through both resistors reducing volume to a minimum. If a potentiometer is used volume can be infinitely controlled.

A light sensing device detects the light intensity and controls the output from a pulse rate controller to the piezoelectric tone generator. As light increases, the current flowing from the pulse rate controller to the piezoelectric tone generator is reduced. In complete darkness the light sensing device cuts off all flow of current to the pulse tone generator cutting off the warning tone completely. However, the pulse rate controller continues to supply power to a light emitting diode through a light emitting diode output resistor to continue to flash. This light emitting diode is clearly visible at nighttime and takes the place of the audio tone.

The above circuit provides an additional level of protection in warning potential thieves from tampering with the vehicle. When they approach or touch the vehicle the warning tone sounds and has a deterrent effect. During nighttime when the light sensing device cuts off power to the tone generator, a light emitting diode will flash and be clearly visible to warn someone that they should back off.

In another embodiment of the invention a standard vehicle alarm is modified with a control circuit to control the level of the alarm set signal. This embodiment comprises the addition of a light detecting device in combination with a pair of potentiometers. The potentiometers and light detecting device are connected to the chirp logic circuit for controlling the output level of the chirp logic circuit. One potentiometer is in parallel while the other is in series. As light decreases, the settings of the potentiometers control the output level of the chirp signal emitted when setting the vehicle alarm. During daylight hours the signal chirp set signal will be at full volume while in the evening or nighttime hours there will be a reduction to the level set by the potentiometer.

The above and other features of this invention will be fully understood from the following detailed description and the accompanying drawings, in which:

DETAILED DESCRIPTION OF THE INVENTION

Figure 1:
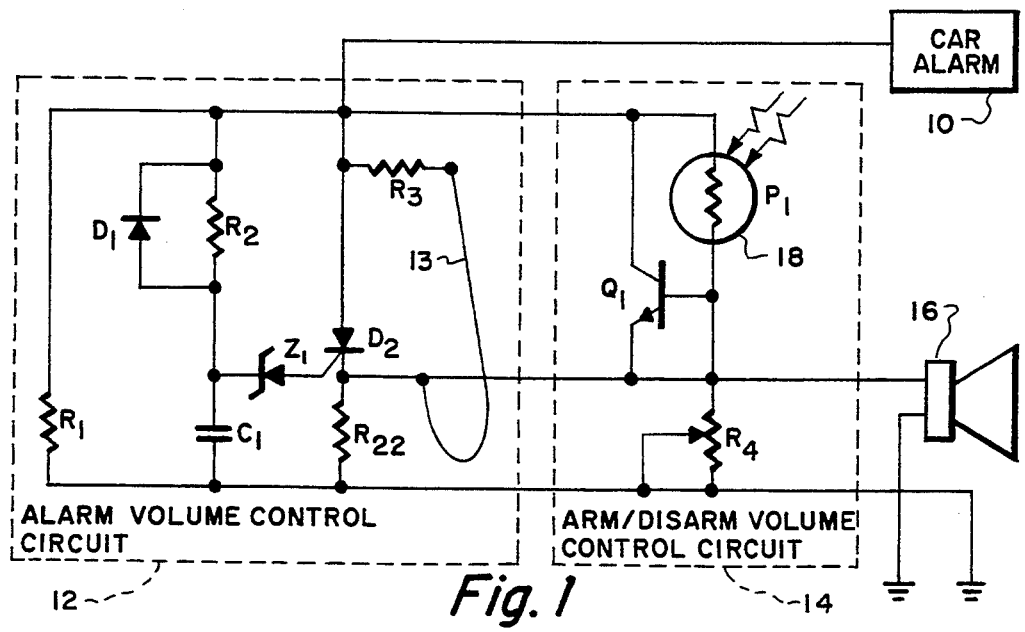
FIG. 1 is a schematic diagram of a chirp volume control circuit to control the volume during the setting of a car alarm.

A system for controlling the volume of a chirp during arm and disarm of a car alarm is illustrated generally in FIG. 1. This system includes a car alarm 10 which can be any standard car alarm available on the market providing an output to an alarm volume control circuit 12 and an arm/disarm volume control circuit 14. Car alarm 10 is designed to put out short duration pulses when the alarm is being set to provide a low level warning tone from siren 16 to indicate that the alarm has been set. Alarm volume control circuit 12 turns on when the car alarm 10 provides long pulse outputs to provide maximum current to siren or audio alarm 16. This occurs whenever tampering occurs with a vehicle setting off the car alarm 10.

A unique aspect of the circuit of the invention is the use of a transistor bypass circuit to control the volume of the audio alarm for siren 16 when the car alarm is being armed or disarmed. Arm/disarm volume control circuit 14 is comprised of a transistor $Q_1$ and a light sensing device or photocell 18 connected across the resistor in series with potentiometer $R_4$. This circuit provides a level or control of the chirp output when arming or disarming the alarm. Light sensitive device 18 detects the amount of light and varies the current flowing through transistor $Q_1$ to the audio alarm 16.

When light levels are high during daylight, light sensing device or photocell 18 ($P_1$) has a very low resistance biasing transistor $Q_1$ on allowing current to flow to siren 16 from car alarm 10. As the light levels diminish, the resistance of photocell or light sensitive device 18 increases biasing transistor $Q_1$ to limit the current flowing to siren 16 thus lowering the volume. Potentiometer $R_4$ allows adjustment of the maximum volume.

SCR (silicon controlled rectifier) block circuit 12 controls the current for maximum output from audio alarm or siren 16. This circuit only allows large long pulses from car alarm 10 to flow to siren 16 or those pulses that are generated when the alarm is set off. The frequency response of silicon control rectifier $D_2$ is controlled by zener diode $Z_1$ and a circuit comprised of resistors $R_1$, $R_2$, and diode $D_1$ and capacitor $C_1$. The volume output to siren 16 from car alarm through SCR block circuit 12 can be varied by resistor $R_3$. Resistor $R_3$ can be a potentiometer which adjusts the volume or by using loop bypass 13 it can be left in or removed from the circuit. Cutting loop bypass 13 removes resistor $R_3$ from the circuit allowing the SCR to pass maximum current to siren 16.

Thus there has been described a volume control circuit for the arm/disarm chirp output that is elegantly simple and very effective. The SCR block circuit passes only low frequency or long pulses to siren or audio alarm 16. Short pulses produced by car alarm 10 are bypassed through the chirp volume control circuit 14 controlled by light sensing device 18.

Figure 2:
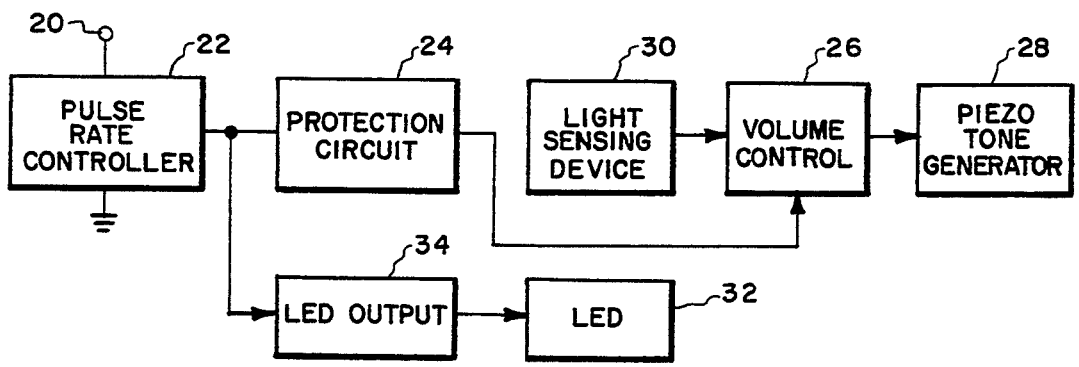
FIG. 2 is a block diagram of a piezoelectric warning tone generator for vehicles.
Figure 3:
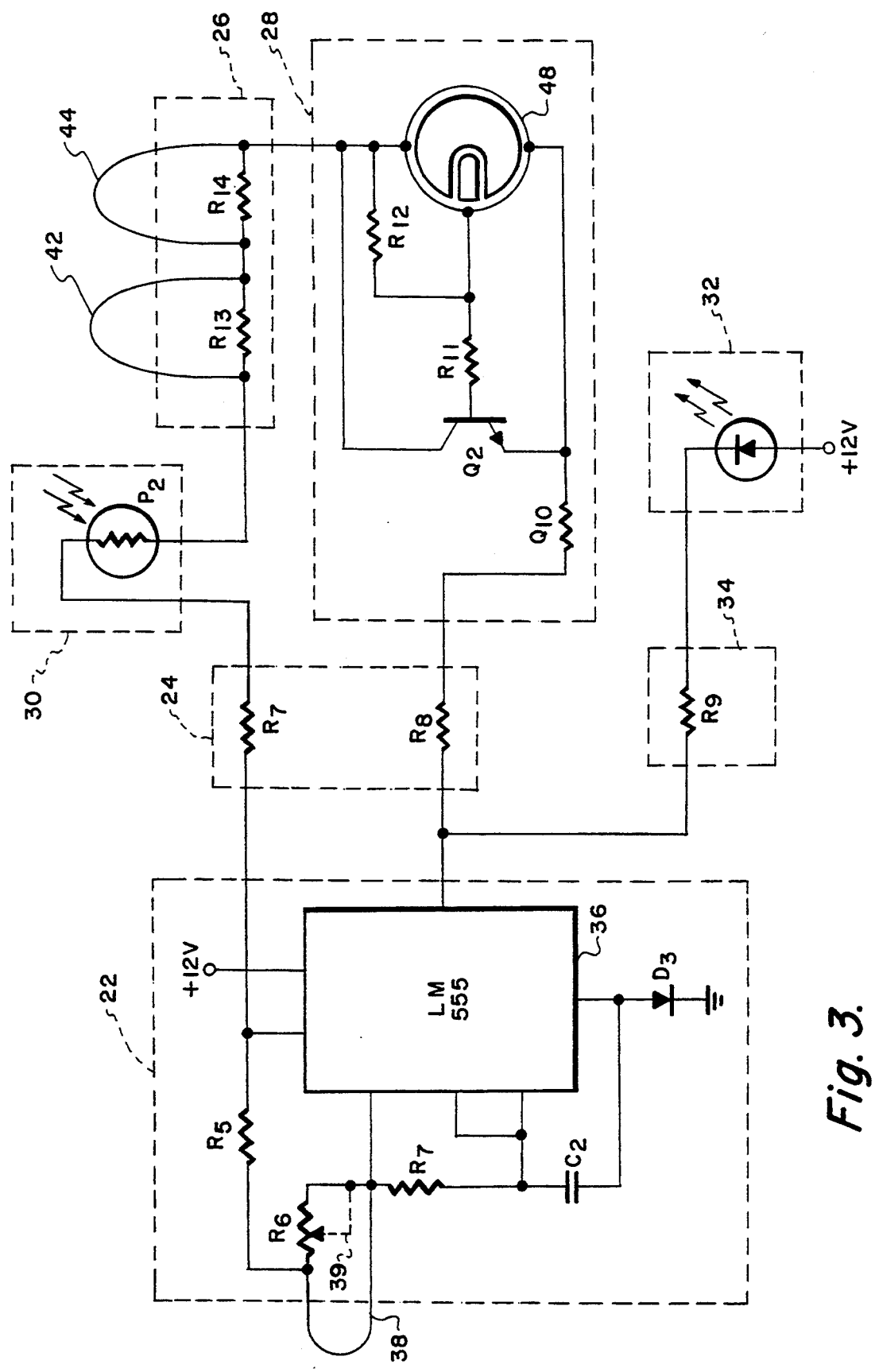
FIG. 3 is a schematic diagram of a piezoelectric warning tone generating device for vehicles having a volume control circuit and light emitting diode for providing a substitute when the warning tone has been reduced in volume.

Another system for providing a deterrent that has a volume control system for setting the alarm set chirp level is shown in FIGS. 2 and 3. Block diagram FIG. 2 illustrates a circuit receiving a 12 volt input from a car battery at 20 for applying power to a pulse rate controller 22. Pulse rate controller 22 provides an output through protection circuit 24 to protect against incorrect connection of the circuit through volume control 26 to piezoelectric tone generator 28. In normal use this system provides a warning tone that acts as a deterrent to potential car thieves. It is simply a low level tone that warns a potential thief that the car he is tampering with may have some type of protection.

This invention improves on the existing warning tone or deterrent devices by adding a light sensing device 30 and a light emitting diode 32 receiving power from LED output device 34 to control the set signal level. As in the previous circuit, the set signal can be an annoyance during the evening hours. Thus light sensing device 30 controls the output through volume control 26 by reducing the flow of current to piezoelectric tone generator 28. As light decreases power from pulse rate controller 22 to piezoelectric tone generator 28 is reduced, reducing the volume of the tones.

In addition to light sensing device, a visible alarm is provided in the form of light emitting diode 32. This is particularly effective when light sensing device 30 completely turns off tone generator 28. Also at this time light conditions will be lower when LED will be more clearly visible. Thus when light sensing device 30 completely cuts off current to piezoelectric tone generator 28 LED 32 will provide a visual output or deterrent signal to a potential intruder.

The circuit for this device is illustrated in FIG. 3. Pulse rate controller 22 is comprised of an LM 555 timer 36 controlled by resistors $R_5$, $R_6$, $R_7$ and capacitor $C_2$. Loop bypass 38 allows the option to select either of two pulse rate values. Optionally $R_6$ can be a potentiometer to vary the pulse rate over a wide range as indicated by dotted line 39.

Resistors $R_7$ and $R_8$ are in protection circuit 24 to protect against overloading of piezoelectric tone generator 48 by incorrectly connecting the circuit. Resistor $R_9$ is an output resistor to control the output to light emitting diode 32. Light emitting diode in the design illustrated blinks at the rate controlled by pulse rate controller 22 simultaneously with the tone generated by piezoelectric tone generator 28. Operation of piezoelectric tone generator 40 is controlled by Resistors $R_{10}$, $R_{11}$, and $R_{12}$ and transistor $Q_2$. Volume of the outputs of the piezoelectric tone generator circuit 28 is controlled by volume control circuit 26 and light sensing device 30. Volume control circuit 26 is comprised of resistors $R_{13}$ and $R_{14}$ which may be bypassed by loop bypasses 42 and 44 providing four discrete volume selections. Alternatively $R_{13}$ or $R_{14}$ or both could be replaced by a single wide range potentiometer which would eliminate the need for bypass loops 42 and 44.

Usually when the volume for tone generator circuit is selected it is not changed therefore loop bypasses 42 and 44 giving four discrete volume settings is sufficient. The maximum volume is achieved by leaving loop bypasses 42 and 44 uncut. A first lower volume is achieved by cutting a loop bypass (e.g. loop bypass 42) to the lowest value of the two resistors $R_{13}$ and $R_{14}$. Cutting loop bypass 42 or 44 to the highest resistor of the two provides a further reduction in volume with maximum volume reduction achieved by cutting both loop bypasses 42 and 44. Volume is also automatically controlled by light sensing device 28 which can be a photocell or other light sensing device which changes its' resistance in response to light conditions.

During daylight hours light sensing device 28 senses maximum light conditions and its' resistance is near zero allowing a maximum tone volume from pulse tone generator circuit 28. As the light dims and nighttime approaches, the resistance of light sensing device 28 increases reducing the current from pulse rate controller to the tone generator circuit 28. When darkness or late night occurs, light sensing device 28 and volume control are set to completely extinguish the output from tone generator circuit 28. However, at this time since visibility of light illuminating devices is high, the LED circuit comprised of LED output device 34 and LED 32 provide a visual warning or deterrent. Thus during the nighttime while the volume of tone generator circuit is off LED is pulsing at the rate controlled by pulse rate controller to provide a visual warning and is clearly visible because of the darkness.

Thus there has been disclosed a tone generating warning circuit that includes both an audible and a visible alarm that has an automatic volume control according to the amount of light. During daylight hours, maximum volume is provided for the tone generator while during evening and night hours, volume is reduced. In complete darkness volume is reduced to near zero with the visible light providing a clearly visible warning 18 signal.

Figure 4:
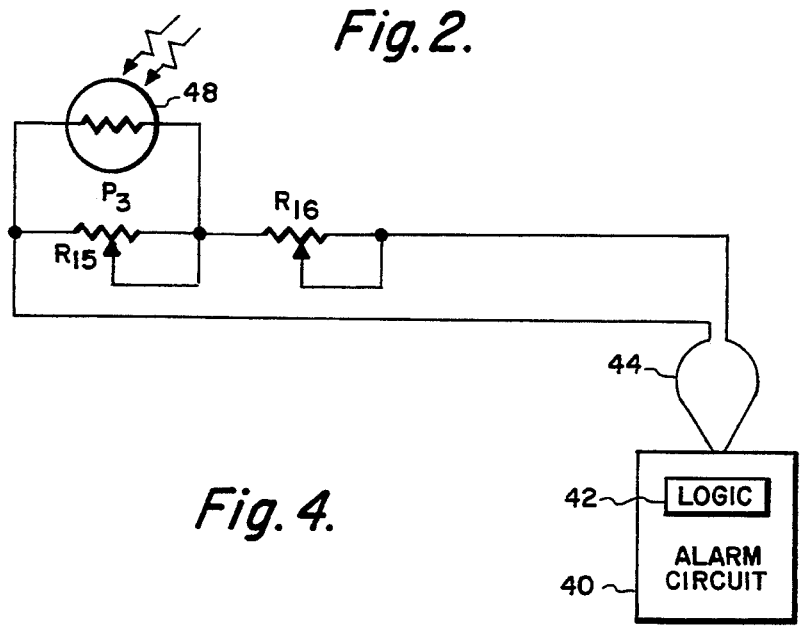
FIG. 4 is a circuit modifying a standard alarm system equipped with a chirp defeat.

A circuit for modifying a standard remote alarm system equipped with a chirp defeat is illustrated in FIG. 4. The standard alarm circuit 40 having a chirp set signal control available from a variety of manufacturers, includes logic circuit 42 for controlling the chirp when the alarm is being set or reset (i.e. turned on or off). These circuits generally have a bypass loop 44 which shorts logic circuit 42 determining whether the chirp defeat circuit is on or off. The loop 44 is cut at 46 to add chirp defeat to the operation of alarm circuit 40.

The present invention proposes modifying the alarm circuit 40 by the introduction of a circuit which can be adjusted to any threshold sensitivity of the alarm's chirp defeat loop. The circuit includes the addition of two potentiometers $R_{15}$, $R_{16}$, one in series, and one in parallel with the logic circuit 42 in standard alarm circuit 40 and a photocell. The circuit shown including photocell 48 ($P_3$) and potentiometers $R_{15}$ and $R_{16}$ will sense darkness or reduced light conditions and can be adjusted to control the level of the chirp circuit for setting or resetting the chirp that indicates when alarm circuit 40 is ready for detecting unauthorized intrusion in a vehicle. By adjusting potentiometers $R_1$ and $R_2$ any threshold sensitivity from very low to very high can be adjusted for the chirp volume. Of course, an output speaker and associated circuitry (not shown) would be connected to the alarm circuit 40.

This circuit of course, can be added to any originally manufactured alarm circuit having chirp defeat circuitry or in an original manufactured alarm circuit having a chirp control including the two potentiometers $R_1$ and $R_2$ and photocell 48.

This invention is not to be limited by the embodiment shown in the drawings and described in the description which is given by way of example and not of limitation, but only in accordance with the scope of the appended claims.

What is claimed is:

1. A vehicle alarm control system comprising; vehicle alarm means;
   audio alarm means receiving an output from said vehicle alarm means;
   alarm volume control means;
   arming signal volume control means for controlling the volume produced by an arming set signal, said arming signal volume control means comprising;
   transistor means receiving an output from said vehicle alarm means;
   photodetecting means connected so as to vary biasing current to said transistor means;
   level control means for controlling the volume produced by said arming set signal;
   whereby the volume of said arming set signal is varied according to light detected by said photodetecting means.

2. The system according to claim 1 in which said alarm volume control means comprises; pulse responsive means for passing long wavelength pulses indicating an alarm condition; and resistance means for setting the volume output of said alarm volume control means.

3. The system according to claim 2 in which said pulse responsive means comprises silicon controlled rectifying means connected to the output of said vehicle alarm; and a zener diode connected to said silicon controlled rectifying means for controlling the frequency response of said silicon controlled rectifying means.

4. The system according to claim 3 in which said resistance means comprises a resistor in parallel with said silicon controlled rectifying means; and means for selectively removing said resistor.

5. The system according to claim 1 in which said audio alarm is a piezoelectric tone generator; said alarm volume control means comprises pulse rate controller circuit means; and said arming signal volume control means comprises light detecting means in series with a preselected resistance.

6. The system according to claim 5 in which said pulse rate controller comprises; timing means, and means for selecting the output pulse rate of said timing means.

7. The system according to claim 6 in which said means for selecting the output pulse rate comprises resistance means; and means for selectively varying said resistance in said pulse rate controller circuit means.

8. The system according to claim 7 including visible alarm indicating means.

9. The system according to claim 8 in which said visible alarm indicating means comprises; a light emitting diode; and a light emitting diode output control.

10. The system according to claim 1 in which said alarm means comprises a standard vehicle alarm means; said arming signal volume control means comprising a logic circuit in said standard vehicle alarm means; and light detecting means and resistive means connected to said logic circuit means.

11. The system according to claim 10 in which said resistive means comprises a pair of potentiometers; one of said potentiometers connected in parallel and the other connected in series with said logic circuit.

12. The system according to claim 7 in which said means for selectively varying said resistance comprises a bypass loop to bypass said resistance means; whereby said resistance means is added to said pulse rate controller circuit means by severing said bypass loop.

13. The system according to claim 7 in which said resistance means comprises a potentiometer for selectively varying said resistance in said pulse rate controller circuit means.

14. The system according to claim 9 in which said means for selectively varying said resistance comprises a bypass loop to bypass said resistance means; whereby said resistance means is added to said pulse rate controller circuit means by severing said bypass loop.

15. The system according to claim 9 in which said resistance means comprises a potentiometer for selectively varying said resistance in said pulse rate controller circuit means.

16. The system according to claim 15 including a volume control circuit comprised of selectively variable resistance means for controlling the volume of said piezoelectric tone generator.

17. The system according to claim 16 in which said selectively variable resistance means comprises a pair of resistors connected in series with said piezoelectric tone generator; and a bypass loop across each resistor of said pair of resistors for selectively bypassing said pair of resistors; whereby volume levels are selected by severing said bypass loops.

18. The system according to claim 5 including a volume control circuit for controlling the volume of said piezoelectric tone generator.

19. The system according to claim 18 in which said volume control circuit comprises selectively variable resistance means for controlling the volume of said piezoelectric tone generator.

20. The system according to claim 19 in which said selectively variable resistance means comprises a pair of resistors connected in series with said piezoelectric tone generator; and a bypass loop across each of said pair of resistors for selectively bypassing said pair of resistors; whereby volume levels are selected by severing said bypass loops.

* * * * *